April 24, 1951 H. L. RAWLINS ET AL 2,550,124
OVERVOLTAGE PROTECTIVE DEVICE
Filed Aug. 30, 1946

WITNESSES:
E.A. McCloskey
Wm. L. Groome

INVENTORS
Herbert L. Rawlins and
James M. Wallace.
BY F. P. Lyle
ATTORNEY

Patented Apr. 24, 1951

2,550,124

UNITED STATES PATENT OFFICE 2,550,124

OVERVOLTAGE PROTECTIVE DEVICE

Herbert L. Rawlins, Pittsburgh, and James M. Wallace, East McKeesport, Pa., assignors to Westinghouse Electric Corporation, East Pittsburgh, Pa., a corporation of Pennsylvania Application August 30, 1946, Serial No. 694,074

11 Claims. (Cl. 175—294)

The present invention relates to overvoltage protective devices for electrical apparatus, and, more particularly, to an overvoltage protective device of the expulsion-tube type which is adapted to operate submerged in oil, or other non-conducting liquid.

Some types of electrical apparatus, such as automatic reclosing circuit breakers, utilize actuating coils which are connected in series in a line. Such series coils are subject to damage by voltage surges on the line, such as may be caused by lightning or by switching operations, and such surges may also cause undesired operation of the circuit breaker. The series coils of apparatus of this kind must, therefore, be protected against voltage surges. The series coils of reclosing circuit breakers have heretofore sometimes been protected by gap devices mounted on the outside of the tank of the circuit breaker. These gap devices, however, had to be insulated for the full line voltage, and were bulky and expensive.

The most desirable arrangement for protecting the series coils of reclosing circuit breakers, and similar apparatus, would be to connect a lightning arrester, or overvoltage protective device, across the coil, so that it would by-pass the coil upon the occurrence of a voltage surge, and would interrupt the power current to remove the bypass as soon as the surge had passed. A relatively low voltage lightning arrester is required for this application, and it must be insulated from ground. In a device such as a reclosing circuit breaker, these requirements can be met by mounting an arrester directly on the frame which supports the series coil, which is insulated from ground. This means, however, that the arrester would be submerged in the oil with which the circuit-breaker tank is filled, and it must be capable, therefore, of operating submerged in oil. Valve-type arresters of usual design can not operate under oil, and it is proposed, according to the present invention, to utilize an arrester of the expulsion-tube type which is especially designed for satisfactory operation when submerged in oil.

The principal object of the invention is to provide an overvoltage protective device, or lightning arrester, of the expulsion-tube type which is capable of operating when submerged in oil, or other non-conducting liquid.

A further object of the invention is to provide a lightning arrester of the expulsion-tube type in which the gap between the electrodes of the arrester is located at the upper end of the tube, and in which the tube is designed to entrap enough air, when it is submerged in liquid, to keep the level of the liquid within the tube below the gap.

Another object of the invention is to provide an electrical device, such as a reclosing circuit breaker, which includes an actuating coil connected in series in a line, and an overvoltage protective device for protecting the coil against voltage surges, the protective device being capable of operation when the coil and protective device are submerged in oil.

The invention will be more fully understood from the following detailed description, taken in connection with the accompanying drawing, in which.

Figure 1:
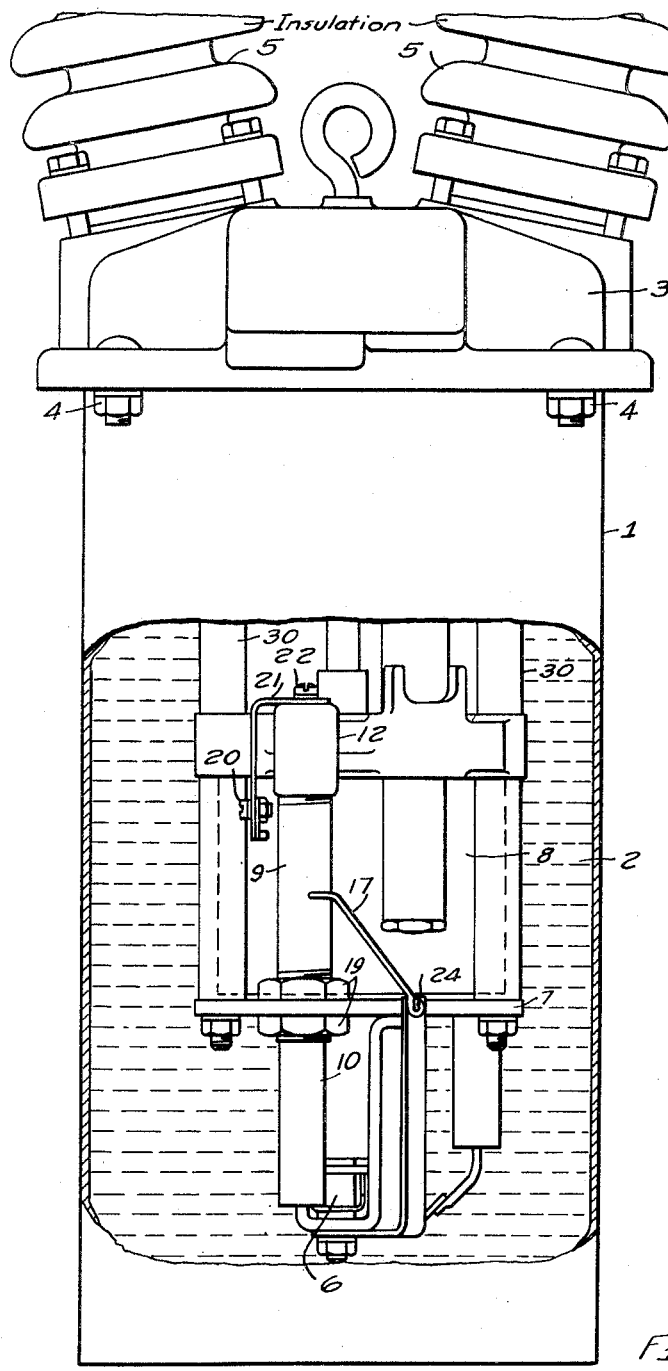
Figure 1 is a view in elevation, partly broken away, of an automatic reclosing circuit breaker embodying the present invention.

Figure 1 shows the new overvoltage protective device applied to an automatic reclosing circuit breaker. The circuit breaker is contained in a metal tank 1 which is filled with oil 2. The operating mechanism of the circuit breaker is housed in a cover 3 secured to the top of the tank 1 by means of bolts 4, and may be of any suitable type. Porcelain terminal bushings 5 are mounted on the cover 3. The interrupting mechanism 6 of the circuit breaker may also be of any suitable type and is supported in the tank 1 on a frame structure 7, which is insulated from ground by suitable insulating supports 30. The circuit breaker also includes an actuating coil 8, which is supported in the frame 7, and which is adapted to be connected in series in a line for actuating the operating mechanism of the circuit breaker.

Since the series coil 8 is connected in series in the line, it is subject to damage by voltage surges on the line, which might also cause undesired operation of the circuit breaker. In accordance with the present invention, the series coil 8 is protected against voltage surges by an overvoltage protective device or lightning arrester 9, which is mounted on the frame structure 7 and connected across the coil 8. Since the coil 8 and frame 7 are submerged in the oil 2 in the tank 1, it will be apparent that the lightning arrester 9 must be capable of operation when completely submerged in oil.

Figure 2:
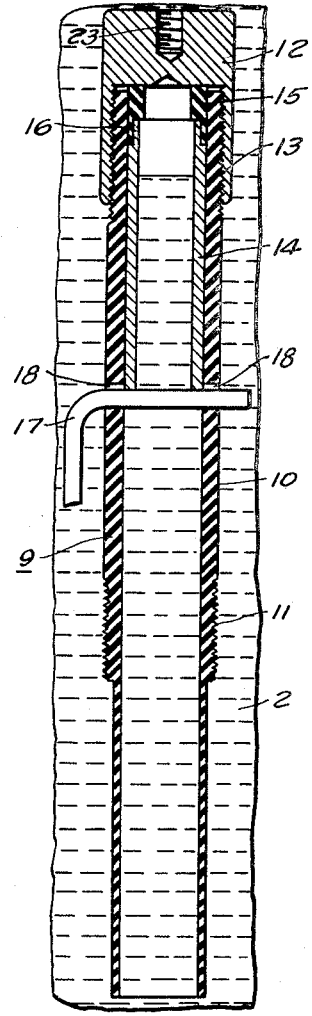
Fig. 2 is a longitudinal sectional view, on a larger scale, of the overvoltage protective device.

The construction of the lightning arrester 9 is shown in detail in Fig. 2. The arrester includes a tube 10 of insulating material, such as hard fiber, or any other suitable insulating material which has sufficient mechanical strength to withstand the gas pressures which occur in operation of the device. The tube 10 is externally threaded intermediate its ends at 11, and the lower portion of the tube 10 below the threaded portion may be made of reduced outside diameter to facilitate assembly and mounting of the device, since the lower part of the tube does not need to have as much mechanical strength as the upper part.

The top of the tube 10 is closed by a metal upper electrode member 12, which fits over the upper part of the tube 10 and is internally threaded to engage corresponding external threads at the top of the tube 10, as indicated at 13, so that the electrode 12 is tightly secured on the tube 10 with a joint which is capable of withstanding the mechanical force resulting from the internal gas pressure during operation.

A lower electrode member 14 is provided within the tube 10. The lower electrode 14 is preferably a piece of steel tubing which fits tightly within the tube 10, and which is spaced from the upper electrode 12 to form a gap between the upper end of the electrode 14 and the lower surface of the electrode 12. The lower electrode 14 may be relatively short as compared to the length of the tube 10. The electrodes 12 and 14 are spaced apart by a tubular insulating spacer member 15 which fits tightly in the tube 10 between the two electrodes. The spacer member 15 may be made of any suitable insulating material, such as hard fiber, which is capable of evolving gas when exposed to an electric arc. The lower end of the spacer 15 may have an annular recess which fits over a corresponding reduced portion of the upper end of the electrode 14, as indicated at 16, to prevent any danger of an arc forming between the upper electrode and the outside of the lower electrode 14, between the lower electrode and the tube 10. It will be seen that when the upper electrode 12 is screwed down tightly on the tube 10, its lower surface engages the spacer 15 and forces it tightly against the lower electrode 14 so that the spacing of the gap between the two electrodes is accurately determined by the dimensions of the spacer 15.

Electrical connection to the lower electrode 14 is provided by means of a rigid conductor 17, which passes through two opposed holes 18 drilled in the tube 10, and thus extends transversely of the tube 10 adjacent the lower end of the electrode 14. It will be apparent that when the upper electrode 12 is tightened down, the lower electrode 14 is forced into tight engagement with the conductor 17, so that good electrical contact is obtained.

The lightning arrester 9 is mounted on the frame 7 of the circuit breaker by means of two nuts 19, threaded on the threaded portion 11 of the tube 10. The conductor 17 is connected at 24 to one side of the series coil 8, which is also connected to one side of the interrupting mechanism 6. The upper electrode 12 is connected to the other side of the coil 8 at 20 by means of a conductor 21 which is secured to the electrode 12 by a screw 22 threaded in a tapped hole 23 in the upper surface of the electrode 12.

It will be apparent that when the tank 1 of the circuit breaker is filled with oil, with the lightning arrester 9 mounted in position on the frame 7, the oil will rise in the tube 10, and the air in the tube will be trapped by the oil. The rising oil will compress this entrapped air until the pressure of the air balances the hydrostatic pressure in the oil, and the entrapped air thus keeps the oil level within the tube at some point below the top of the tube. The tube 10 is made long enough so that enough air is entrapped in the tube to keep the level of the oil within the tube well below the gap between the electrodes 12 and 14, when the tank is completely filled with oil, as shown in Fig. 2. Thus, even though the arrester 9 is completely submerged in oil, the gap within the arrester is still in air, and it will break down upon the occurrence of a voltage surge at a low enough voltage to protect the coil, and to prevent undesired operation of the circuit breaker.

The operation of the arrester 9 is similar to that of any arrester of the expulsion-tube type. When a voltage appears across the coil 8 which is greater than the breakdown voltage of the gap between the electrodes 12 and 14, the gap breaks down and an arc is established between the lower surface of the electrode 12 and the upper edge of the lower electrode 14, thus bypassing the coil 8 and protecting it from the over-voltage. The presence of this arc passing across the surface of the spacer 15 causes the evolution of large quantities of relatively un-ionized gas from the spacer, and this gas mixes turbulently with the arc gases. The high pressure resulting from the evolution of large quantities of gas in the small bore of the tube causes the arc to be blown downward and the ionized arc gases are expelled from the tube, so that the power arc is interrupted. The blast of gas resulting from operation of the device forces the oil down, out of the tube 10, and the gases escape from the tube and bubble up through the oil in the tank 1, thus relieving the pressure in the tube. As the pressure is relieved, the oil, of course, rises again in the tube 10 until the remaining air and gas in the tube are compressed to substantially their previous volume, and the arrester is ready for further operations.

It will be apparent that the tube 10 must be made long enough so that when the air and heated gas in the tube are compressed after operation of the arrester, there will be sufficient air and gas remaining in the tube to keep the level of the oil below the gap, since the device would become inoperative for its intended purpose if the oil completely filled the tube, and its breakdown voltage would be raised to too high a value if the oil partially filled the gap. This danger can easily be avoided, however, by making the tube 10 sufficiently long as compared to the spacing of the gap. Thus, in one actual embodiment of the invention, the gap was made one-quarter inch long, and the tube 10 was about eight inches in length. These dimensions are merely illustrative, as there is no critical relation between the gap spacing and the tube length, the only requirement being that the tube be very long as compared to the gap spacing to insure retaining sufficient air within the tube after it has operated.

Figure 3:
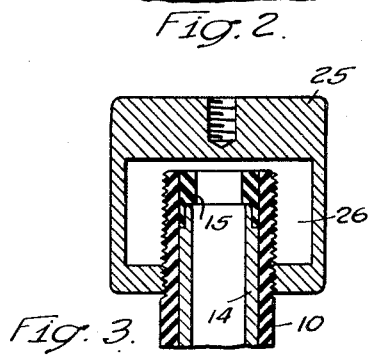
Fig. 3 is a fragmentary sectional view showing a modified embodiment of the invention.

Reclosing circuit breakers of the type shown in Fig. 1 are usually shipped filled with oil, and there is some risk that in the handling and shipping of the device, and in mounting it in position, the breaker may be turned on its side, or even inverted. If this should occur, with the construction of Fig. 2, there would be considerable danger of the entrapped air in the tube 10 escaping, and permitting the tube to completely fill with oil, thus making the arrester inoperative. This danger may be avoided by the construction shown in Fig. 3. The lightning arrester of this embodiment of the invention is identical to that of Fig. 2, except for the upper electrode 25. As shown in Fig. 3, the electrode 25 is of considerably larger outside diameter than the tube 10, and is formed with an annular chamber 26 extending completely around it and communicating with the open upper end of the tube 10. The electrode 25 is threaded on the tube 10 in the same manner as the electrode 12 of Fig. 2, but with its lower surface spaced a small distance from the upper end of the tube 10 to permit communication between the interior of the tube and the annular chamber 26. The construction of the arrester is otherwise the same as that shown in Fig. 2.

When the arrester of Fig. 3 is submerged in oil, the entrapped air fills the annular chamber 26 as well as the upper part of the tube 10, and in case the arrester should be moved from a vertical position, or inverted, the air in the chamber 26 cannot escape, but is retained within the electrode 25, so that after the tube is again turned to its proper position, enough entrapped air remains to keep the level of the oil below the gap. Thus, this construction eliminates any danger of the arrester being made inoperative by accidental inversion of the device.

It will now be apparent that an overvoltage protective device has been provided for the series coil of a reclosing circuit breaker, or other device, which is relatively inexpensive and which results in a very compact construction, since the protective device is mounted within the tank of the circuit breaker itself on the frame which supports the series coil, which is insulated from ground. Thus, the necessity of mounting the protective device on the outside of the tank and of providing extra insulation is eliminated. This result is made possible by the special design of the lightning arrester, which permits it to operate satisfactorily when completely submerged in oil. Thus, adequate protection for the series coil is provided in a simple and inexpensive manner.

A specific application of the lightning arrester of the present invention has been shown and described, but it will be apparent that the arrester is also suitable for other applications where it must be submerged in oil, and, although a particular construction of the arrester itself has been shown and described, it is to be understood that various modifications may be made within the scope of the invention. The invention is not limited, therefore, to the particular details of construction shown, or to the particular application described, but in its broadest aspects, it includes all equivalent embodiments and modifications which come within the scope of the appended claims.

We claim as our invention:

1. An overvoltage protective device adapted to operate submerged in oil or other non-conducting liquid, said protective device comprising a vertical tubular structure closed at the upper end, said tubular structure including spaced electrode means forming a spark gap within the tubular structure immediately adjacent the closed end thereof, and insulating material within the tubular structure closely adjacent the path of a discharge in said spark gap, said insulating material being of a type which evolves gas when exposed to an electric arc, and said tubular structure being very long, as compared to the length of the spark gap, whereby enough air is entrapped in the tubular structure when it is submerged in liquid in a substantially vertical position to keep the level of liquid in the tubular structure below the spark gap.

2. An overvoltage protective device adapted to operate submerged in oil or other non-conducting liquid, said protective device comprising a vertical tubular structure, an electrode member closing the upper end of said tubular structure, the tubular structure including a second electrode member spaced from the first-mentioned electrode member to form a spark gap within the tubular structure immediately adjacent the closed end thereof, and insulating material within the tubular structure closely adjacent the path of a discharge in said spark gap, said insulating material being of a type which evolves gas when exposed to an electric arc, and said tubular structure being very long, as compared to the length of the spark gap, whereby enough air is entrapped in the tubular structure when it is submerged in liquid in a substantially vertical position to keep the level of liquid in the tubular structure below the spark gap.

3. An overvoltage protective device adapted to operate submerged in oil or other non-conducting liquid, said protective device comprising a vertical tubular structure, an electrode member closing the upper end of said tubular structure, the tubular structure including a second electrode member, said second electrode member extending nearly to the top of the tubular structure, and an insulating spacer member between said electrode members spacing them apart to form a spark gap within the tubular structure immediately adjacent the closed end thereof, said spacer member including insulating material of a type which evolves gas when exposed to an electric arc, and said tubular structure being very long, as compared to the length of the spark gap, whereby enough air is entrapped in the tubular structure when it is submerged in liquid in a substantially vertical position to keep the level of liquid in the tubular structure below the spark gap.

4. An overvoltage protective device adapted to operate submerged in oil or other non-conducting liquid, said protective device comprising a vertical tubular structure, an electrode member closing the upper end of said tubular structure, the tubular structure including a tubular electrode member, said tubular electrode member extending nearly to the top of the tubular structure, and a tubular insulating spacer member disposed between said electrode members and spacing them apart to form a spark gap within the tubular structure immediately adjacent the closed end thereof, said spacer member including insulating material of a type which evolves gas when exposed to an electric arc, and said tubular structure being very long, as compared to the length of the spark gap, whereby enough air is entrapped in the tubular structure when it is submerged in liquid in a substantially vertical position to keep the level of liquid in the tubular structure below the spark gap.

5. An overvoltage protective device adapted to operate submerged in oil or other non-conducting liquid, said protective device comprising a vertical tube of insulating material, an electrode member closing the upper end of said tube, a tubular electrode member fitting within the tube and spaced from the first-mentioned electrode member, said tubular electrode member extending nearly to the top of the tube, and a tubular insulating spacer member fitting in the tube between said electrode members to space them apart to form a spark gap within the tube immediately adjacent the closed end thereof, said insulating spacer member including insulating material of a type which evolves gas when exposed to an electric arc, and said tube being very long, as compared to the length of the spark gap, whereby enough air is entrapped in the tube when it is submerged in liquid in a substantially vertical position to keep the level of liquid in the tube below the spark gap.

6. An overvoltage protective device adapted to operate submerged in oil or other non-conducting liquid, said protective device comprising a tube of insulating material, an electrode member closing one end of said tube, a tubular electrode member fitting within the tube and spaced from the first-mentioned electrode member, a tubular insulating spacer member fitting in the tube between said electrode members to space them apart to form a spark gap within the tube adjacent the closed end thereof, said insulating spacer member including insulating material of a type which evolves gas when exposed to an electric arc, and a conducting member extending transversely of the tube, said conducting member being disposed in electrical contact with said tubular electrode member and extending outside of the tube, the tube extending beyond the tubular electrode and being very long, as compared to the length of the spark gap, whereby enough air is entrapped in the tube when it is submerged in liquid in a substantially vertical position to keep the level of liquid in the tube below the spark gap.

7. An overvoltage protective device adapted to operate submerged in oil or other non-conducting liquid, said protective device comprising a tubular structure, an electrode member closing one end of said tubular structure, the tubular structure including a second electrode member spaced from the first-mentioned electrode member to form a spark gap within the tubular structure adjacent the closed end thereof, and insulating material within the tubular structure closely adjacent the path of a discharge in said spark gap, said insulating material being of a type which evolves gas when exposed to an electric arc, said tubular structure being very long, as compared to the length of the spark gap, whereby enough air is entrapped in the tubular structure when it is submerged in liquid in a substantially vertical position to keep the level of liquid in the tubular structure below the spark gap, and said first-mentioned electrode member including means for retaining said entrapped air when the protective device is moved from a vertical position.

8. An overvoltage protective device adapted to operate submerged in oil or other non-conducting liquid, said protective device comprising a tubular structure, an electrode member closing one end of said tubular structure, the tubular structure including a second electrode member spaced from the first-mentioned electrode member to form a spark gap within the tubular structure adjacent the closed end thereof, and insulating material within the tubular structure closely adjacent the path of a discharge in said spark gap, said insulating material being of a type which evolves gas when exposed to an electric arc, said tubular structure being very long, as compared to the length of the spark gap, whereby enough air is entrapped in the tubular structure when it is submerged in liquid in a substantially vertical position to keep the level of liquid in the tubular structure below the spark gap, and said first-mentioned electrode member including an annular chamber outside of the tubular structure and below its upper end, said annular chamber communicating with the upper end of the tubular structure to retain said entrapped air when the protective device is moved from a vertical position.

9. An electrical device disposed in a tank containing a non-conducting liquid, said electrical device including a frame structure submerged in said liquid and insulated from ground, an actuating coil adapted to be connected in series in a line, said coil being mounted in the frame structure, and an overvoltage protective device mounted on the frame structure and electrically connected across the coil for protecting the coil against voltage surges, said overvoltage protective device comprising a vertical tubular structure closed at the upper end, spaced electrode means forming a spark gap within the tubular structure adjacent the upper end thereof, said tubular structure including insulating material of a type which evolves gas when exposed to an electric arc, said insulating material being disposed closely adjacent the path of a discharge in the gap, and the tubular structure being very long, as compared to the length of the gap, whereby sufficient air is entrapped in the upper part of the tubular structure to keep the level of liquid in the tubular structure below the gap.

10. A circuit breaker including a tank containing a non-conducting liquid, a frame structure disposed in the tank and submerged in the liquid, said frame structure being insulated from ground, circuit-interrupting means supported on the frame structure below the level of the liquid, an actuating coil for effecting operation of the circuit-interrupting means, said actuating coil being adapted to be connected in series in a line and being mounted in said frame structure below the level of the liquid, and an overvoltage protective device mounted on the frame structure and electrically connected across the coil for protecting the coil against voltage surges, said overvoltage protective device comprising a vertical tubular structure closed at the upper end, spaced electrode means forming a spark gap within the tubular structure adjacent the upper end thereof, said tubular structure including insulating material of a type which evolves gas when exposed to an electric arc, said insulating material being disposed closely adjacent the path of a discharge in the gap, and the tubular structure being very long, as compared to the length of the gap, whereby sufficient air is entrapped in the upper part of the tubular structure to keep the level of liquid in the tubular structure below the gap.

11. A circuit breaker including a tank containing a non-conducting liquid, a frame structure disposed in the tank and submerged in the liquid, said frame structure being insulated from ground, circuit-interrupting means supported on the frame structure below the level of the liquid, an actuating coil for effecting operation of the circuit-interrupting means, said actuating coil being adapted to be connected in series in a line and being mounted in said frame structure below the level of the liquid, and an overvoltage protective device mounted on the frame structure and electrically connected across the coil for protecting the coil against voltage surges, said overvoltage protective device comprising a vertical tubular structure closed at the upper end, spaced electrode means forming a spark gap within the tubular structure adjacent the upper end thereof, said tubular structure including insulating material of a type which evolves gas when exposed to an electric arc, said insulating material being disposed closely adjacent the path of a discharge in the gap, and the tubular structure being very long, as compared to the length of the gap, whereby sufficient air is entrapped in the upper part of the tubular structure to keep the level of liquid in the tubular structure below the gap, and said overvoltage protective device being mounted so that the open lower end of the tubular structure is closely adjacent the circuit-interrupting means.

HERBERT L. RAWLINS.
JAMES M. WALLACE.

REFERENCES CITED

The following references are of record in the file of this patent:

UNITED STATES PATENTS

| Number | Name | Date |
| --- | --- | --- |
| 656,680 | Thomson | Aug. 28, 1900 |
| 1,152,149 | Davis | Aug. 31, 1915 |
| 1,385,980 | Allcutt | Aug. 2, 1921 |
| 1,651,872 | Creighton | Dec. 6, 1927 |
| 2,010,018 | Hodnette | Aug. 6, 1935 |
| 2,050,397 | Torok | Aug. 11, 1936 |
| 2,155,841 | Rorden | Apr. 25, 1939 |
| 2,156,410 | Taylor | May 2, 1939 |
| 2,177,744 | Pittman | Oct. 31, 1939 |
| 2,311,699 | Schwager | Feb. 23, 1943 |
| 2,333,604 | Wallace | Nov. 2, 1943 |
| 2,414,786 | Lincks et al. | Jan. 21, 1947 |

FOREIGN PATENTS

| Number | Country | Date |
| --- | --- | --- |
| 528,895 | Great Britain | Nov. 8, 1940 |